Figure 1:
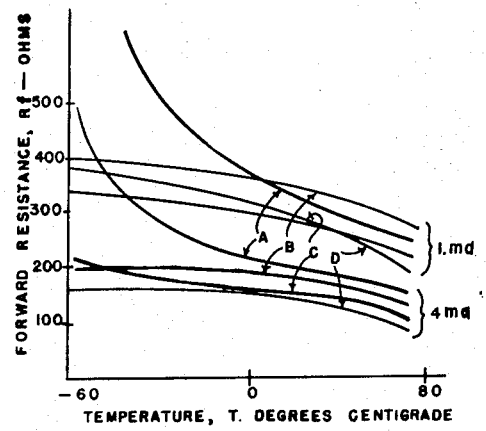

INVENTOR.
WILLIAM F. HALDEMAN

The invention described herein may be manufactured and used by or for the Government of the United Sates of America for governmental purposes without the payment of any royalties thereon or therefor.

My invention relates to semi-conductor type rectifiers and is particularly directed to improved means and methods of testing, selecting and grouping such rectifiers.

I have found that semi-conductor rectifiers, such as the commercially known and available germanium rectifiers have effective resistance-current characteristics defined by the expression $$I^{-a} = bR \qquad (1)$$

where I and R are, respectively, the current through and effective resistance of the rectifier, and $a$ and $b$ are constants. Effective resistance is defined to be that linear or ohmic resistance which will deliver the same average current during a specified voltage pulse as does the non-linear rectifier when subjected to the same voltage pulse. Further reference to effective resistance will hereinafter be made when specifiic circuits are described. It also has been found, unfortunately, that the exponent $a$ and the constant, $b$, varies during use of the rectifier and causes considerable trouble in circuits in which the rectifiers have been incorporated and calibrated. Means and methods for stabilizing the constants $a$ and $b$ are described in detail in my co-pending application entitled "Stabilizing Semi-Conductor Rectifiers," Serial No. 336,892, filed February 13, 1953.

The object of my invention is novel methods and means of testing, selecting and grouping semi-conductor rectifiers having the current-effective resistance characteristics defined by $$I^{-a} = bR$$

Another object of my invention is novel means of testing the current-effective resistance characteristics of an electrical component whose effective resistance varies exponentially with current through the component.

In accordance with the subject invention, an effective resistance measurement is made while each of two predetermined values of current is passed through each one of a multiplicity of components having a characteristic relationship between current and effective resistance represented by the equation, $1^{-a} = bR$, where, as stated above, I is for current, R is for effective resistance, $b$ is for a conductance constant, and $a$ is for a constant exponent. Next, the two effective resistance measurements for each component are converted into a numeral such as a ratio, for example, which provides a convenient indicium of the current-resistance parameters of the individual component. Finally, the components having substantially equal indicia, or those having such indicia falling within a predetermined range of acceptability are grouped together. It will be observed, of course, that such grouping may be made in any prearranged manner. For example, containers may be provided and designated to receive components having prechosen indicia marked thereon; or components having similar or substantially equal indicia may be piled together or laid side by side on a predesignated portion of a surface.

Figure 2:
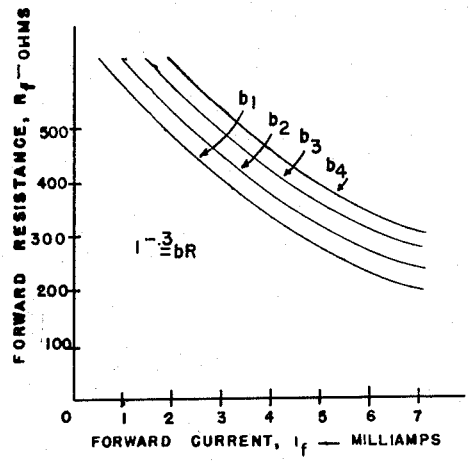
Figure 3:
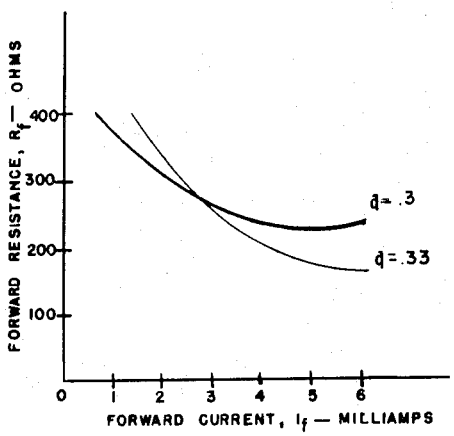
Figure 4:
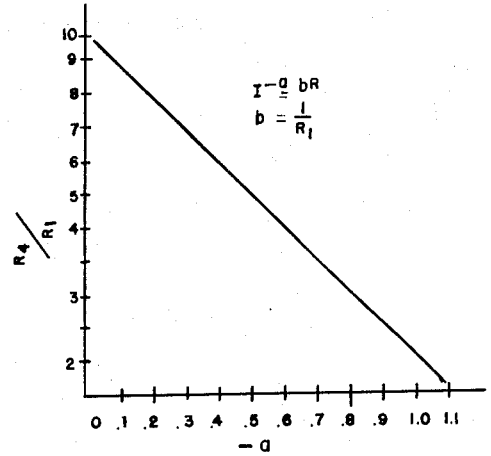
Figure 5:
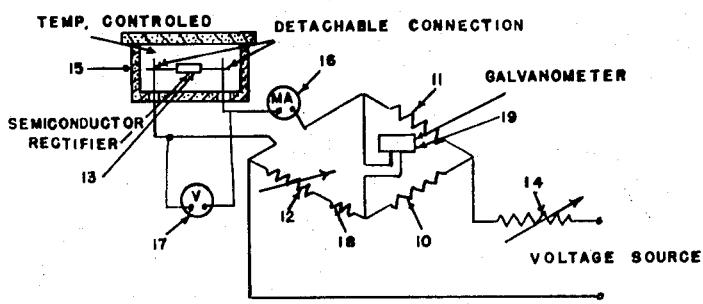

Other objects and the scope of my invention will become apparent from the embodiment described in the following specification and shown in the accompanying drawing in which Fig. 1 shows the temperature vs. forward resistance characteristic of a plurality of commercially available germanium type rectifiers, Fig. 2 is the forward effective resistance-current characteristics of one rectifier for various values of $b$ in the relation $I^{-a} = bR$, Fig. 3 is the forward effective resistance-current characteristic of one rectifier for different values of constant $a$ in the relation $I^{-a} = bR$, Fig. 4 shows a nomograph which may be employed in my novel method, and Fig. 5 is a circuit diagram of the resistance measuring device of my invention.

A semi-conductor rectifier of the germanium type is not a linear element. Ohms law $E = IR$ is modified to $E^a = bI$ where $a$, typically, may be approximately 1.85 and $b$ is approximately .145. The two constants in the expression describe the current carrying capacity for any one germanium diode under one set of conditions. For example, commercially available germanium rectifiers are subject to considerable variations in forward resistance as temperature changes. The resistance-temperature behavior of four different rectifiers, A, B, C and D, with 4 milliamperes of current flowing are quite unpredictable. The curves in Fig. 1 show how the forward resistance of commercially available germanium rectifiers varies with temperature. The same four rectifiers yield another and different family of curves, when 1 milliampere of current flows. The back resistance, also, of germanium rectifiers, it is found, decreases as temperature increases. The conductivity of germanium depends markedly upon the amount and nature of impurities present. Very pure germanium may have a resistivity of the order of 10–30 ohm-centimeters, at room temperature, whereas theorectically pure germanium has a resistivity of approximately 60 ohm-centimeters. Germanium of the type used in rectifiers referred to in this specification may have resistivity values ranging from the order of a few tenths to a few ohm-centimeters. At normal operating temperatures, conductivity results primarily from impurity contributed electrons whereas at elevated temperature conductivity results to a greater extent from contribution of intrinsic electrons by the germanium. The effects of heating germanium containing impurities may vary depending upon the value of the impurities, but as indicated in my co-pending application, supra, temperature cycling apparently tends to stabilize the role of the impurities. As the crystal ages the impurities apparently shift into more stable positions, and it is found desirable to accelerate the aging for proper stabilization. Acceleration of the aging process is also described in my said co-pending application. In many circuit applications, changing characteristics are particularly troublesome if they occur after the rectifiers have been assembled and calibrated in a circuit.

As indicated by the curves in Fig. 2, rectifier effective forward resistance is dependent upon forward current in an orderly dependence. In Fig. 2 effective forward resistance of one rectifier is plotted against current, for various values of the $b$ constant, with one value of the exponent $a$. In Fig. 3, effective forward resistance of one rectifier is plotted against current for two values of the exponent $a$, with one value of the constant $b$, and constant temperatures.

In all cases when empirically obtained current and resistance data were plotted, $a$ and $b$ could be determined for any rectifier and it was found that additional points when checked against the values predicted by the exponential equation were found to be as accurate as the original measurements.

According to an important feature of my invention, the equation $I^{-a}=bR$ for any rectifier can be solved by measuring effective resistance while each of two values of current flows through the rectifier. For convenience, resistance is measured while 1 milliampere and then 4 milliamperes flow. If the current, I, of 1 milliampere is considered unity, then $I^{-a}=1$ and $b=1/R$. Now, if $b=1/R$, then $$I^{-a}=\frac{R_4}{R_1} \quad (2)$$

where $R_1$ and $R_4$ are the effective forward resistances of a rectifier with 1 and 4 units of current, respectively, of current flowing through the rectifier. Hence, the shape of the characteristic of a rectifier is qualitatively defined by the ratio, $R_4/R_1$, and may be used in selecting and grouping the rectifiers. Where the ratio of the effective resistances or the value of the exponent $a$ is desirable, it is apparent that such may be produced for example by a slide rule. Furthermore, it will be obvious to persons skilled in the art that equivalent means for obtaining the value of the aforesaid ratios may be one of the many types of commercially available electrical or electromechanical computers, well known to practitioners in the business machine, automatic calculator, and automation fields. The term $b$ may be obtained by measuring the forward resistance at unity current and calculating the reciprocal of the resistance value in ohms. According to an important feature of my invention, rectifiers selected and grouped according to their similarity of $a$ values, or according to their $R_4/R_1$ values, have similar characteristic curves which will not cross as shown in Fig. 3 and the calibrated circuits in which such rectifiers may be used will not become unbalanced for any normal operating current. By selecting rectifiers of somewhat different $b$ values for any one circuit application to obtain vertical spacing of their characteristic curves as in Fig. 2, there will be further assurance that cross-overs of the characteristics will not occur in use.

In factory practice it has been found desirable, first, to test each rectifier for its back resistance to cull out the obviously defective diodes. Next, it has been found convenient to roughly group the diodes having a back resistance of 300,000 ohms or over into one bin, and to group into a second bin all diodes having back resistances between 200,000 and 300,000 ohms. Then all rectifiers are allowed to stabilize in temperature, preferably at room temperature. It has been found desirable for this purpose to permit the rectifiers to stand in the open in an even temperatured room for 6 to 24 hours. Then each diode is successively clipped into test equipment for measuring the resistance of each rectifier for each of two forward currents.

One circuit for measuring the two forward resistances, $R_1$ and $R_4$, is diagrammed in Fig. 5. The particular bridge circuit shown comprises the two equal resistances 10 and 11, the variable resistance 12, and the rectifier 13 to be tested. A steady direct current source is connected across one diagonal of the bridge through the variable resistor 14 of proper ohmic range and of precision manufacture to accurately control the current through the bridge and through the rectifier 13 to be tested. Bridge balance is determined by a galvanometer 19 or other sensitive voltage detecting means connected across the opposite diagonal of the bridge. In operation, each rectifier 13 to be tested is successively clipped into the leg of the bridge circuit as shown, care being taken during handling to not disturb the temperature of the rectifier as by body temperature of the operator. A temperature controlled cabinet may if desired enclose the rectifier during testing. First the voltage source is adjusted by resistor 14 until a predetermined value of current, $I_1$, flows in a forward direction through the rectifier as indicated by the milliameter 16 in series with the rectifier. A voltmeter 17 connected in parallel with the rectifier then yields the necessary information to calculate the effective resistance, $R_1$, of the rectifier. Conveniently, the variable resistance 12 may be calibrated to read directly the resistance of the rectifier in the adjacent leg by adding a fixed resistance 18 in series with resistance 12 and equal in ohmic value to the resistance of the milliammeter 16. Bridge balance is always maintained by observing the galvanometer 19 and adjusting resistor 12 accordingly.

Next, a second resistance, $R_4$, for a second current $I_4$, is measured, without disturbing the rectifier. Resistance 14 is adjusted until $I_4$ flows at 16, the bridge is balanced, and the resistance at 12 is read. This reading is $R_4$. Finally, the ratio of the two resistance values, $R_4/R_1$, is calculated.

Conveniently, the rectifiers are each identified by the ratio number, or by the corresponding $a$ number read from the nomograph, which is marked on the rectifier or on a label attached to the rectifier.

Experience has shown that networks containing a plurality of diodes which have been grouped according to their $a$ and $b$ values may be used for long periods of time under extreme temperature conditions and with wide ranges of current without disturbance of the operation or calibration of the circuits in which they are incorporated. Matched rectifiers are particularly important in circuits using pulse current or alternating current because of the distortions imparted to the wave forms by the non-linear effective resistance characteristics of the rectifiers.

Many modifications may be made in the circuitry for testing, and in the chronological order of several testing steps, without department from the scope of my invention. My invention, for example, may be employed to test and match any component having an exponential resistance-current characteristic. Components of this type may thus be conveniently grouped in spite of their non-linear characteristics.

I claim:

1. The method of grouping semi-conductor type current rectifiers according to their current carrying exponential function of resistance defined by the expression $$I^{-a}=bR$$

where I is current, R is resistance, $b$ is a conductance constant and $a$ is a constant exponent of said function, said method comprising bringing all the rectifiers of a group to a constant and common temperature, applying a forward voltage to each of said group of rectifiers, adjusting the applied voltage source until the forward current through each rectifier becomes a single predetermined first value, measuring the forward resistance of each rectifier while the current of said predetermined first value is flowing through the rectifiers, then adjusting the applied voltage source until the forward current through each rectifier becomes a predetermined second value, measuring the forward resistance of each rectifier while the current of said predetermined second value is flowing through the rectifiers, computing the ratio of the two aforesaid forward effective resistances of each rectifier in an inanimate computing means and finally assembling said rectifiers in groups wherein each group is comprised of rectifiers having computed ratios falling within a predetermined value range of acceptance.

2. The method of selecting the electrical-circuit components having substantially equal parameters of current and resistance from a group of the said components wherein each has a set of current and resistance parameters mutually related in accordance with the formula, $I^{-a}=bR$, where I is for current, R is for effective resistance, $b$ is for a conductance constant, and $a$ is for a constant exponent, and wherein the said current-resistance parameters for each of the said components collectively form a miscellany of different and substantially equal sets of parameters, the said method comprising: bringing all of the said components to the same constant temperature; applying a forward voltage to each of the said components sufficient to produce a current through each having a predetermined first value; measuring the effective resistance of each of the said components during the flow of the aforesaid first-value current; applying a second forward voltage to each of the said components sufficient to produce a current through each having a predetermined second value; measuring the effective resistance of each of the said components during the flow of the aforesaid second-value current; putting the said aforesaid measured resistances of each of the said components into an inanimate computing means; computing the ratio between the said resistances of each of the said components in the aforesaid computing means; and designating each of the said components in accordance with its ratio and, therefore, sets of current-resistance parameters, such that the said components may be arranged in accordance with any desired scheme.

3. In a procedure for rearranging a group of electrical-circuit components, mixed as to their respective sets of current-effective resistance parameters, into subgroups containing components having substantially equal current-resistance parameters, and wherein each of the components of the said group has a common current-resistance characteristic curve represented by the formula $I^{-a} = bR$ where I is for current, R is for effective resistance, $b$ is for a conductance constant, and $a$ is for a constant exponent, and wherein, to facilitate the formation of the said subgroups, the said procedure includes calculating the ratio between two effective resistances of each of the said components to produce a number representative of the set of current-resistance parameters of the said component, the method of ascertaining and preparing the two said effective resistances for the said calculation comprising: establishing all of the components of the said group at the same temperature; passing a current having a first predetermined value through each of the said components; measuring the effective resistance of each of the said components during the passage of the said first-value current; passing a current having a second predetermined value through each of the said components; measuring a second effective resistance of each of the said components during the passage of the second-value current; and recording the aforesaid measured resistances of each component.

References Cited in the file of this patent
UNITED STATES PATENTS 2,553,986     Statham _____ May 22, 1951

OTHER REFERENCES

Crystal Rectifiers, by Henry C. Torrey, first edition 1948, McGraw Hill Book Company, pp. 21, 41, 42.